US008116436B2

(12) United States Patent
Isenberg

(10) Patent No.: US 8,116,436 B2
(45) Date of Patent: Feb. 14, 2012

(54) TECHNIQUE FOR VERIFYING IDENTITIES OF USERS OF A COMMUNICATIONS SERVICE BY VOICEPRINTS

(75) Inventor: Neil E. Isenberg, Portland, OR (US)

(73) Assignee: Grape Technology Group, Inc., Bethlehem, PA (US)

( * ) Notice: Subject to any disclaimer, the term of this patent is extended or adjusted under 35 U.S.C. 154(b) by 1867 days.

(21) Appl. No.: 11/065,682

(22) Filed: Feb. 24, 2005

(65) Prior Publication Data

US 2006/0188076 A1  Aug. 24, 2006

(51) Int. Cl.
 H04M 1/64 (2006.01)
 H04M 1/56 (2006.01)
(52) U.S. Cl. .............. 379/88.02; 379/88.19; 379/142.01
(58) Field of Classification Search ............... 379/88.01, 379/88.02, 88.19, 142.01
See application file for complete search history.

(56) References Cited

U.S. PATENT DOCUMENTS

| | | | | |
|---|---|---|---|---|
| 3,896,266 A * | 7/1975 | Waterbury | ............... | 379/114.19 |
| 5,502,759 A * | 3/1996 | Cheng et al. | ............... | 379/88.02 |
| 5,797,092 A * | 8/1998 | Cox et al. | .................... | 455/404.1 |
| 6,104,913 A * | 8/2000 | McAllister | .................... | 455/41.1 |
| 6,154,788 A * | 11/2000 | Robinson et al. | ................. | 710/8 |
| 6,246,751 B1 * | 6/2001 | Bergl et al. | .................. | 379/67.1 |
| 6,356,868 B1 * | 3/2002 | Yuschik et al. | ................ | 704/246 |
| 6,526,126 B1 * | 2/2003 | Morganstein et al. | ..... | 379/88.02 |
| 6,535,582 B1 * | 3/2003 | Harris | ........................ | 379/88.01 |
| 7,340,042 B2 * | 3/2008 | Cluff et al. | ................. | 379/88.02 |
| 7,386,448 B1 * | 6/2008 | Poss et al. | ..................... | 704/247 |
| 7,590,232 B2 * | 9/2009 | Carter et al. | ............. | 379/209.01 |
| 7,698,566 B1 * | 4/2010 | Stone | ............................ | 713/186 |
| 7,734,025 B2 * | 6/2010 | Baker | ...................... | 379/114.01 |
| 7,929,681 B2 * | 4/2011 | Henry | ...................... | 379/218.01 |
| 7,991,129 B2 * | 8/2011 | Timmins et al. | ........... | 379/88.26 |
| 8,023,622 B2 * | 9/2011 | Timmins et al. | ........... | 379/88.13 |
| 2002/0152078 A1 * | 10/2002 | Yuschik et al. | ................ | 704/273 |
| 2004/0170261 A1 * | 9/2004 | Baker | ...................... | 379/114.01 |
| 2004/0190688 A1 * | 9/2004 | Timmins et al. | ........... | 379/88.02 |
| 2004/0223593 A1 * | 11/2004 | Timmins et al. | ........... | 379/88.02 |
| 2004/0247092 A1 * | 12/2004 | Timmins et al. | ........... | 379/88.16 |
| 2005/0002507 A1 * | 1/2005 | Timmins et al. | .............. | 379/188 |
| 2005/0041783 A1 * | 2/2005 | Timmins et al. | ........... | 379/88.02 |
| 2005/0041784 A1 * | 2/2005 | Timmins et al. | ........... | 379/88.02 |
| 2005/0058262 A1 * | 3/2005 | Timmins et al. | ........... | 379/88.02 |
| 2006/0020459 A1 * | 1/2006 | Carter et al. | .................. | 704/246 |
| 2006/0023849 A1 * | 2/2006 | Timmins et al. | ........... | 379/88.19 |
| 2006/0046740 A1 * | 3/2006 | Johnson | ..................... | 455/456.1 |
| 2006/0188076 A1 * | 8/2006 | Isenberg | .................... | 379/88.02 |
| 2006/0245576 A1 * | 11/2006 | Henry | ...................... | 379/265.01 |
| 2007/0106517 A1 * | 5/2007 | Cluff et al. | .................... | 704/273 |
| 2009/0252304 A1 * | 10/2009 | Timmins et al. | ........... | 379/88.02 |
| 2011/0116611 A1 * | 5/2011 | Baker | ...................... | 379/114.03 |
| 2011/0213615 A1 * | 9/2011 | Summerfield et al. | ........ | 704/246 |
| 2011/0224986 A1 * | 9/2011 | Summerfield | ................ | 704/246 |

* cited by examiner

*Primary Examiner* — Joseph T Phan
(74) *Attorney, Agent, or Firm* — Sofer & Haroun, LLP

(57) ABSTRACT

A voiceprint of a calling party, and identifying information, are obtained during a call. One or more voiceprint samples stored in association with the identifying information are selected, and the calling party's identity is verified based on a comparison of the voiceprint to at least one of the selected voiceprint samples. For example, the voiceprint samples may be derived from a verbal utterance by the calling party before the call, mixed with different background noises likely corrupting the calling party's utterance during the call. If the comparison fails to determine the calling party's identity, an attempt to verify the calling party's identity is made based on additional information received during the call. In another example, if the calling party's identity is verified based on the additional information, the voiceprint may be stored in association with the identifying information as a voiceprint sample for use in future verification of the calling party's identity.

26 Claims, 13 Drawing Sheets

302

|   | Voiceprint Sample | Date |
|---|---|---|
| 811 | V_SAMPLE_REG | --- |
| 812 | V_SAMPLE_1 | 03-22-YYYY |
| 813 | V_SAMPLE_2 | 06-19-YYYY |
| 814 | V_SAMPLE_3 | 09-05-YYYY |
| 815 | V_SAMPLE_4 | 09-16-YYYY |

(806 = Voiceprint Sample column; 808 = Date column)

Fig. 8

|     | Voiceprint Sample (806) | Date (808)  |
| --- | --- | --- |
| 811 | V_SAMPLE_REG | --- |
| 812 |  |  |
| 813 | V_SAMPLE_2 | 06-19-YYYY |
| 814 | V_SAMPLE_3 | 09-05-YYYY |
| 815 | V_SAMPLE_4 | 09-16-YYYY |

Fig. 9

|  | 806 | 808 |
|---|---|---|
|  | Voiceprint Sample | Date |
| 811 | V_SAMPLE_REG | --- |
| 812 | V_SAMPLE_5 | 10-08-YYYY |
| 813 | V_SAMPLE_2 | 06-19-YYYY |
| 814 | V_SAMPLE_3 | 09-05-YYYY |
| 815 | V_SAMPLE_4 | 09-16-YYYY |

TECHNIQUE FOR VERIFYING IDENTITIES OF USERS OF A COMMUNICATIONS SERVICE BY VOICEPRINTS

FIELD OF THE INVENTION

The invention relates to communications methods and systems and, more particularly, to a method and system for providing a communications service, e.g., an information assistance service, using voiceprints to identify its users.

BACKGROUND OF THE INVENTION

It is a common experience to use a telephone or similar device to call an operator for information assistance. In a typical information assistance call, a caller identifies to the operator the name and address (sometimes city or area code) of a party whose telephone number is desired. In response, the operator locates the desired destination number using a computer database, for example. The destination number is then provided to the caller. The number may be provided by a computerized voice server which provides automated voicing of the number. The caller may be afforded an option to be connected to the destination number without the need of first terminating the information assistance call.

It should be noted that even though a user may subscribe to a telephone service provided by a particular carrier (e.g., AT&T Wireless Services Inc.) or branding partner (e.g., Virgin), the information assistance service accessed through the telephone service may be contracted by the carrier to a third party, and is therefore run by an independent contractor. That is, carriers may contract different independent providers to provide information assistance services for them. When a subscriber to the carrier makes an information assistance call by dialing such typical access digits as "411," "*555," "555-1212," "00," "1-800-555-1212," etc., because of the contractual relationship, the carrier would switch such an information assistance call to its contracted information assistance service provider to handle the call.

Independent providers may provide different information assistance services and service features in addition to directory assistance. For example, upon request, an operator may provide a user with information on regional restaurants, movie listings, and directions to various places and the ability to purchase goods and services, etc. The assignee of the present application is an information assistance service provider which provides, among others, personalized services and special service features, which are different or lacking from other providers. For instance, one such service feature is a StarBack® service feature described in U.S. Pat. No. 5,797,092, whereby a caller, after being connected to a desired party, may be connected back to the assistance service provider by pressing a "*" key on their telephone, or otherwise issuing a command (e.g., saying the word "operator"). Examples of the assignee's personalized services include private directory assistance service and foreign language directory assistance service, which are described, for example, in U.S. Pat. No. 5,966,437 and International Publication No. WO 01/35621.

Users may therefore be motivated to subscribe to independent information service providers for directory assistance and the other offered services. Users may pay the independent information service provider at the time of the call for that call, by credit card, for example, or may establish subscription accounts, facilitating their use of the system.

When a subscriber to an independent information service provider calls the service from a wireline phone, the service may identify the originating phone based on identifiers in the call set-up signals associated with the call, such as an Automatic Number Identifier ("ANI"). If a wireless phone is used, the identifier may be the phone number, also known as a Mobile Identification Number ("MIN") of the wireless phone. If the phone is registered with the service in association with the subscriber and/or the subscriber's account, identification of the phone initiating the call may enable identification of the subscriber, as well. Instead of identifying the phone calling the system, the system might identify a customer account. For example, a business customer may obtain a unique phone number to access the communications service for use by authorized parties under the business account. In that case, a dialed number identification service ("DNIS") string in the call-set-up signals may be used to identify the account with which the caller is associated.

To verify that the caller is the subscriber associated with the registered phone or account, an operator or voice response unit ("VRU") may ask the caller to provide user verification information, such as a personal identification number ("PIN"). Providing a PIN each time the service is called can be annoying and time consuming. In addition, certain customers may have trouble remembering their PIN. To verify the identity of the caller, the operator may then have to ask for additional information, such as the subscriber's name, address, mother's maiden name, credit card number, etc., which the customer may have provided during registration with the system. This may embarrass and annoy the subscriber, as well as be even more time consuming.

In addition, if multiple parties are associated with a subscriber's account, such as family members or employees of a business, use of the ANI may enable identification of the account, but will not enable identification of which one of the multiple parties to the account is calling. As discussed above, an operator or VRU may request additional information to identify the caller, such as a PIN, however, use of a PIN may be problematic.

Voiceprints have been used to assist in identifying a customer of a communications system, as described, e.g., in copending, commonly assigned application Ser. No. 10/403,207, filed on Mar. 31, 2003 ("the '207 application"), incorporated herein by reference. According to the described technique, a voiceprint of a caller may be compared to a stored voiceprint sample based on a voiceprint previously provided by a party. For example, a voiceprint sample may be derived from verbal utterances of the party provided during a registration process. The party may be asked to repeat a password or phrase multiple times, which the system records and processes into a voiceprint sample. The result of the comparison of the voiceprint and the voiceprint sample may be a score indicative of the degree of correspondence between the voiceprint and the voiceprint sample, which may be compared to a threshold. If the threshold is met or exceeded, the party providing the voiceprint is considered to be the same party that provided the voiceprint sample.

SUMMARY OF THE INVENTION

The invention is premised upon the recognition that although the voiceprint verification methodology described in the '207 application is generally effective, it yields a significant number of false negative results in certain circumstances, which is not desirable. The success or failure of the voiceprint comparison may be determined in part by physiological factors related to the calling party physical condition. For example, it has been observed that as an individual ages, his/her voice may undergo subtle changes affecting the frequencies present therein and other characteristics of the voice. Consequently, a voiceprint obtained from a party during a particular call may exhibit slightly different characteristics than a voiceprint sample obtained previously, and a comparison of the two may fail to verify the party's identity. Similarly, an individual's voice may vary due to other physiological factors, such as when he/she is sick, if he/she gains or loses weight, etc.

Another factor contributing to the success or failure of the voiceprint comparison is the quality of the call itself. A signal received from a wireless phone or a speakerphone may contain more background noise than a wireline phone. For example, a call received from a caller located inside a car may contain undesirable sounds produced by the car's air conditioner, or by traffic, etc. If a voiceprint obtained during the call contains such background noise, a confidence score produced by comparing the voiceprint to a stored voiceprint sample obtained previously may be relatively low, causing an authentic caller to fail the voiceprint test.

In accordance with a first embodiment of the invention, data concerning a calling party is obtained when the calling party's identity is verified during a call. A voiceprint is derived from a verbal utterance by the calling party during the call. The identity of the calling party is verified based on a comparison of the voiceprint with one or more voiceprint samples stored in association with the data concerning the calling party. If the comparison fails to verify the identity of the calling party, the identity of the calling party is determined based on identifying information received during the call. If the identity of the calling party is determined based on the identifying information, the voiceprint may be stored in association with the data as a voiceprint sample for use in future verification of the calling party's identity.

In accordance with a second embodiment of the invention, a voice signal containing a verbal utterance by a calling party before a call is obtained, e.g., during a service registration. The voice signal is mixed with at least one audio signal containing a selected background noise (e.g., sound generated by a car's air conditioner), resulting in a mixed signal. A voiceprint sample is derived from the mixed signal, which is stored in association with data concerning the calling party. The data is received from the call. The voiceprint sample is retrieved based on the received data. A second voice signal containing a verbal utterance by the calling party is obtained during the call. A voiceprint is derived from the second voice signal, which is compared with the voiceprint sample to verify the calling party's identity.

BRIEF DESCRIPTION OF THE DRAWINGS

Further objects, features and advantages of the invention will become apparent from the following detailed description taken in conjunction with the accompanying drawing showing an illustrative embodiment of the invention, in which:

FIGS. 8, 9 and 10 illustrate a series of examples of a voiceprint sample table in accordance with the first embodiment;

DETAILED DESCRIPTION

The invention is directed toward generating and using voiceprints for the purpose of verifying the identity of a user of a communications service, e.g., an information assistance service. For example, when a information assistance call is received from a calling party, a voiceprint of the calling party is derived during the call. Identifying information, such as an ANI, is also received during the call, and a preliminary determination as to the caller's identity is made based on the identifying information. For example, a user profile may be retrieved based on the ANI. One or more voiceprint samples stored in association with the identifying information are selected, and the caller's identity is verified based on a comparison of the currently derived voiceprint to at least one of the stored voiceprint samples.

The success or failure of the voiceprint comparison may be determined in part by physiological factors related to the calling party physical condition. For example, it has been observed that as an individual ages, his/her voice may undergo subtle changes affecting the frequencies present therein and other characteristics of the voice. Consequently, a voiceprint obtained from a party during a particular call may exhibit slightly different characteristics than a voiceprint sample obtained previously, and a comparison of the two may fail to verify the party's identity. Similarly, an individual's voice may vary due to other physiological factors, such as when he/she is sick, if he/she gains or loses weight, etc.

If the comparison fails to confirm the calling party's identity, the calling party's identity is verified based on additional information obtained by an operator during the call, such as a PIN, mother's maiden name, etc. If the caller's identity is verified by the operator, the currently derived voiceprint may be stored in association with the identifying information as another voiceprint sample to be used to verify the user's identity, in accordance with an aspect of the invention.

Figure 1:
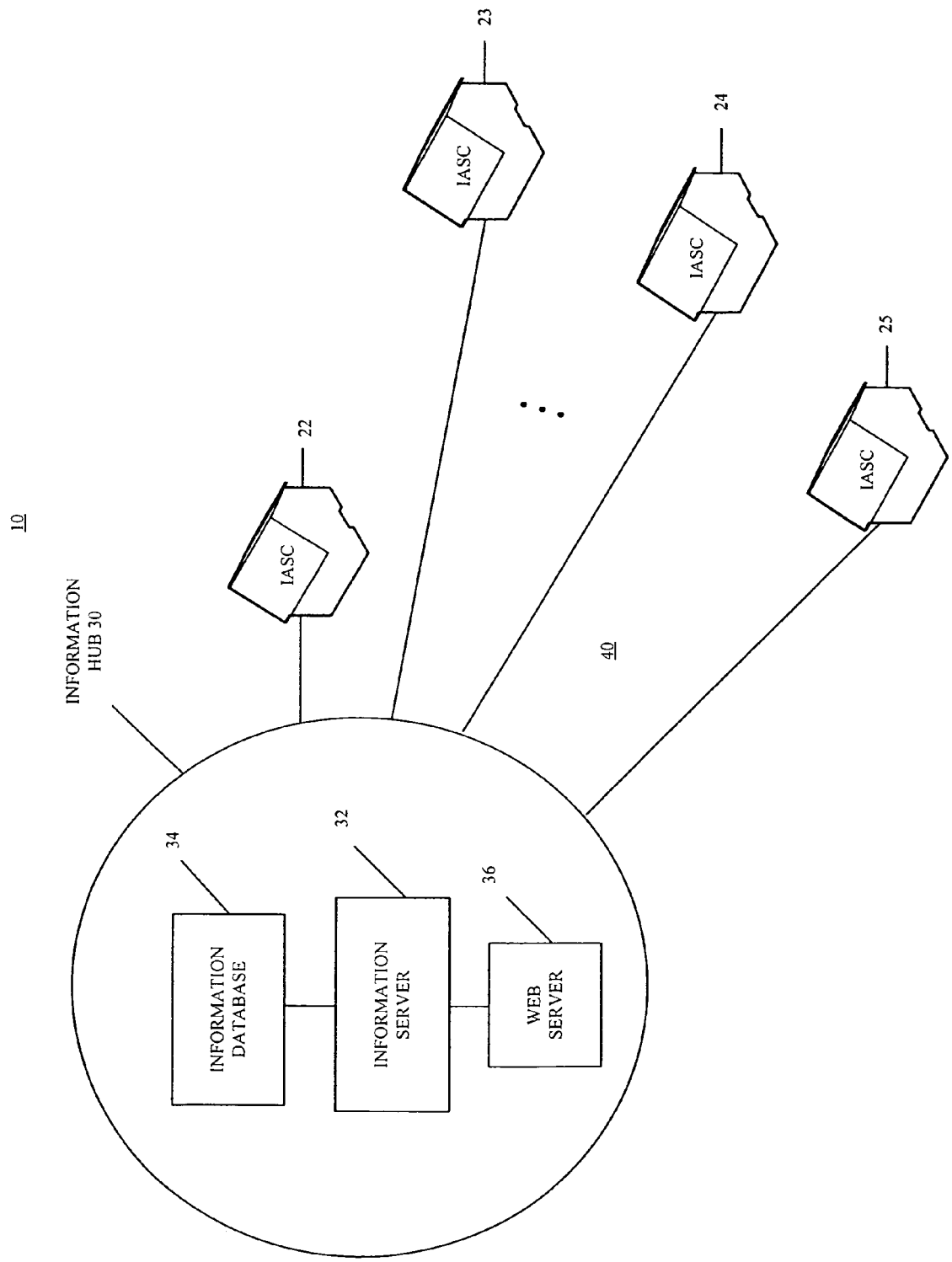
FIG. 1 illustrates a communications system including information assistance service centers ("IASCs"), in accordance with the invention.

FIG. 1 illustrates an example of a communications system 10 for implementing the present inventions, in accordance with an embodiment of the invention. In this example, communications system 10 is used to provide an information assistance service. System 10 includes a plurality of operators dispersed throughout a wide coverage area in information assistance service centers (IASCs), denoted 22 through 25. It should be noted that the term "operators" used herein broadly encompasses entities that are capable of providing assistance in a telecommunications environment, including without limitation human operators, voice response/recognition capabilities, web-/WAP-enabled operator services, and other automated and electronic access. IASCs 22 through 25 are coupled to each other and to one or more information hubs 30 through a network 40. The network 40 may be a wide area network ("WAN") covering an extensive area, for example. WAN 40 may be an Internet-based network such as the World Wide Web or a private intranet-based network. Each of IASCs 22 through 28 may cover one or more regional coverage areas.

Information assistance service system 10 may be accessed directly by a user on a wireline phone, wireless phone, and other such communications devices through which a customer may communicate with system 10 by voice.

Information hub 30 may include one or more processors, such as information server 32, which is accessible by the operators in the system 10, and one or more memory devices, such as information database 34, in which identifying information about each subscriber to the information assistance service is stored and maintained. The user information may be in the form of individual subscriber folders for each current subscriber account. Each subscriber account may include one or more individual users. For example, a single account may include multiple members of a family or multiple employees of a business.

Each folder may be associated with one or more communications identifications of the respective subscriber's communications devices that the subscriber has registered with system 10 as part of the account establishment. For example, the communications identification may be a phone number of a subscriber's wireline or wireless phone, which may be represented by an ANI contained in a call setup signal resulting from establishing a call originating from the wireline or wireless phone over a communications network, e.g., a public switched telephone network (PSTN). The presence or absence of a subscriber folder corresponding to a phone number or other such identifying data may be used to indicate whether a caller is a subscriber to the service or not.

The folder may include a user profile, as described in co-pending application Ser. No. 09/865,230, filed on May 25, 2002 ("the '230 application"), assigned to the assignee of the present invention and incorporated by reference herein. The user profile may contain preferences of the subscriber related to subscribed services, such as preferred ways of receiving the services, and methods of delivering information to the subscriber. Information server 32 may include clock and calendar functions. The user profile may also contain one or more voiceprint samples of the one or more subscribers associated with the account. The voiceprint samples may be compared to a voiceprint received from a caller to verify the identity of the caller, enabling greater personalization of services, as described further, below.

The personal preferences in the user profile may be specified by a subscriber during registration with system 10 via a phone call, for example, in response to registration questions posed by an operator or a voice response unit ("VRU"), for example. Personal preferences may also be entered and changed via a web page. A subscriber will typically also register the phone number of each phone that may be used to call system 10, and identify the type of phone as a wireline or wireless phone. A phone that is used as a speakerphone may also be identified as such.

One or more verbal utterances may be obtained during the registration process and/or during subsequent calls between a subscriber and system 10 to derive a voiceprint sample, as discussed further below. If there are multiple parties to an account, each party may provide a verbal utterance during registration by speaking on the phone in turn, or at a later date.

Subscriber folders and other such information may also be stored locally at one or more of the IASCs, as described in the '230 application. Local storage may speed access to the information by a respective IASC 22 through 25. The folders and information at different IASCs may be synchronized. Synchronized databases provide necessary backup as well as support to roaming mobile device users.

Web server 36 may also be provided in information hub 30, coupled to information server 32 and/or other servers. Subscriber account information, such as billing information, may be stored in web server 36. The system's web site may also be provided by web server 36 or by another server connected to the Internet. Web server 36 may be coupled to system 10 at other locations, as well.

Figure 2:
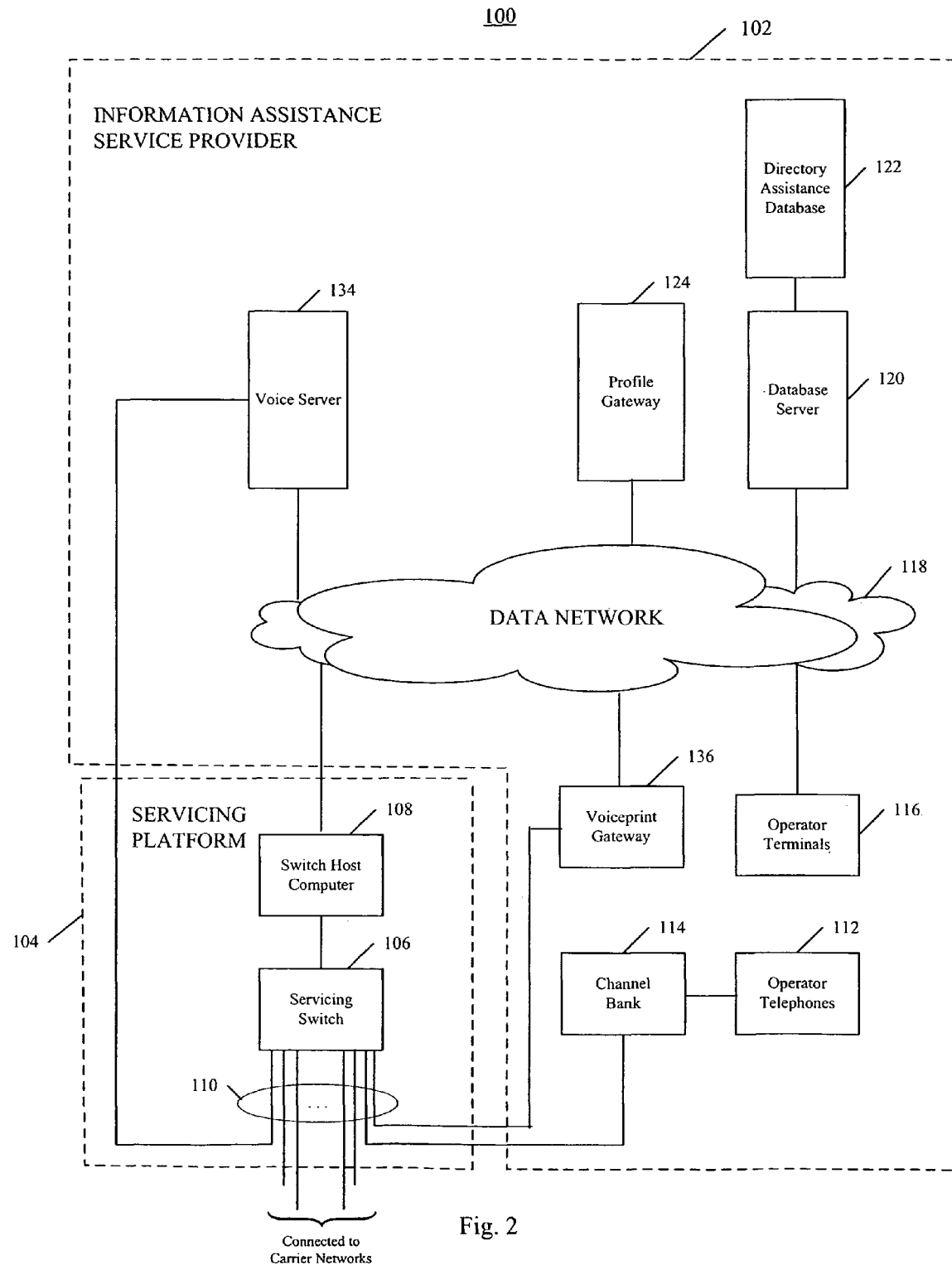
FIG. 2 is an example of an IASC of FIG. 1, in more detail.

FIG. 2 illustrates an example of an IASC 100, which generically represents one of aforementioned IASCs 22 through 25, in more detail. IASC 100 comprises information assistance service provider ("IASP") 102 and servicing platform 104. Servicing platform 104 may be part of IASP 102 or separate from it. Servicing platform 104 may be located in the same geographic area or in a different geographic area than the associated IASP 102.

Servicing platform 104 includes an interface, such as a servicing switch 106, and a switch host computer 108. Switch 106 is a conventional switch connected via one or more external T1 links 110, including digital T1 links, to one or more carrier networks (not shown). T1 links 110 may be voice, data and/or video connections through which incoming and outgoing voice, data, and/or video communications can be made. Outgoing communications may be placed over the same or different carrier networks than the carrier network from which the incoming communication was received. Switch 106 includes digital signal processing (DSP) circuitry. Thus, switch 106 can be programmed and reprogrammed to function as, among other things, call progress analyzers (CPAs), call progress generators (CPGs), multi-frequency (MF) tone generators/detectors, dual-tone multi-frequency (DTMF) generators/detectors, and/or conferencing units, depending upon the demand placed on IASP 102 and switch 106 for each corresponding function.

Switch host computer 108 may be programmed to control the operation of servicing switch 106, as well as the operation of the other components of IASP 102 described below. Servicing switch 106 may also be programmed to control some or all operations of the switch, instead of or in addition to the control provided by switch host computer 108. Switch host computer 108 and servicing switch 106 may each be private branch exchange ("PBX") components.

One or more operators in IASP 102 are equipped with operator telephones 112, which are coupled to servicing switch 106 via channel bank 114 and a T1 link 110. The one or more operators are also equipped with respective terminals 116. Each terminal 116 includes a video display unit and a keyboard with associated dialing pad (not shown). Operator terminals 116 are connected over data network 118 to one or more database servers 120 (although only one is shown here). The database server 120 is coupled to one or more directory assistance databases 122 and other databases (not shown).

Operators at operator terminals 116 may access database server 120 to obtain requested information, such as a user's desired party and the appropriate destination telephone number of the party, by conducting searches for the requested information. Other information assistance or specialized communications services, such as restaurant recommendations, movie listings, events, special offers, etc., may also be provided by searching through database server 120.

Data network 118 includes a local area network (LAN) supplemented by a number of point-to-point data links, for example. Through data network 118 and routers (not shown), components of IASP 102 may also be connected to the Internet.

Figure 3:
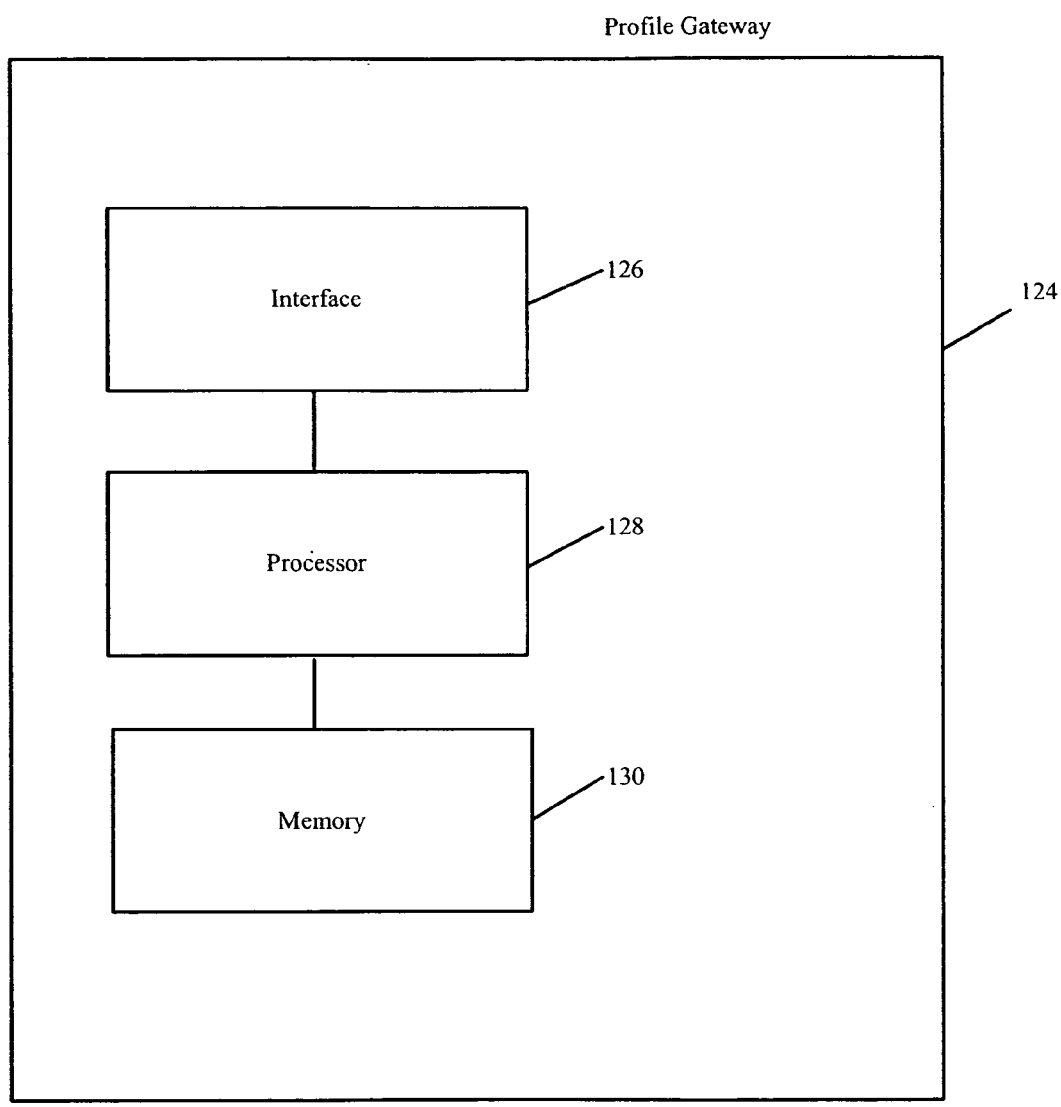
FIG. 3 is an example of a profile gateway of FIG. 2, in more detail.

IASP 102 also includes profile gateway 124 coupled to data network 118. Profile gateway 124 contacts information hub 30 to request information about a subscriber, such as a subscriber profile. Profile gateway 124 may comprise interface 126, processor 128 and memory 130, as shown in FIG. 3.

Memory 130 here generically includes disks, caches and volatile and non-volatile memory.

Voice server 134, which may be a voice response unit ("VRU"), for example, is used to play the constantly repeated parts of an operator's speech, such as, the various greetings and signoffs (or closings). Voice server 134 may also have voice recognition capability, to interpret verbal statements made by a customer. For example, instead of connecting a call to an operator, switch host computer 108 may connect the call to voice server 134, which may request that the customer recite the name of a party, for example, if the customer desires directory assistance, as described further below. Voice server 134 is connected via data network 108 to switch host computer 108 and via one or more T1 spans to switch 106. Voice server 134 may comprise a general purpose computer and one or more voice cards for voice recognition, voice recording and playback, and call progress analysis, for example. If more than one voice server is provided, each one is connected to servicing switch 106 by a separate T1 link.

At appropriate stages in a call progression, switch host computer 108 initiates a voice path connection between voice server 134 and switch 106 so that the caller, or the caller and the operator, are able to hear whatever pre-recorded speech is played on that connection by voice server 134. Switch host computer 108 then instructs voice server 134, via data network 118, what type of message to play, and passes data parameters that enable voice server 134 to locate the message appropriate to the call.

Figure 4:
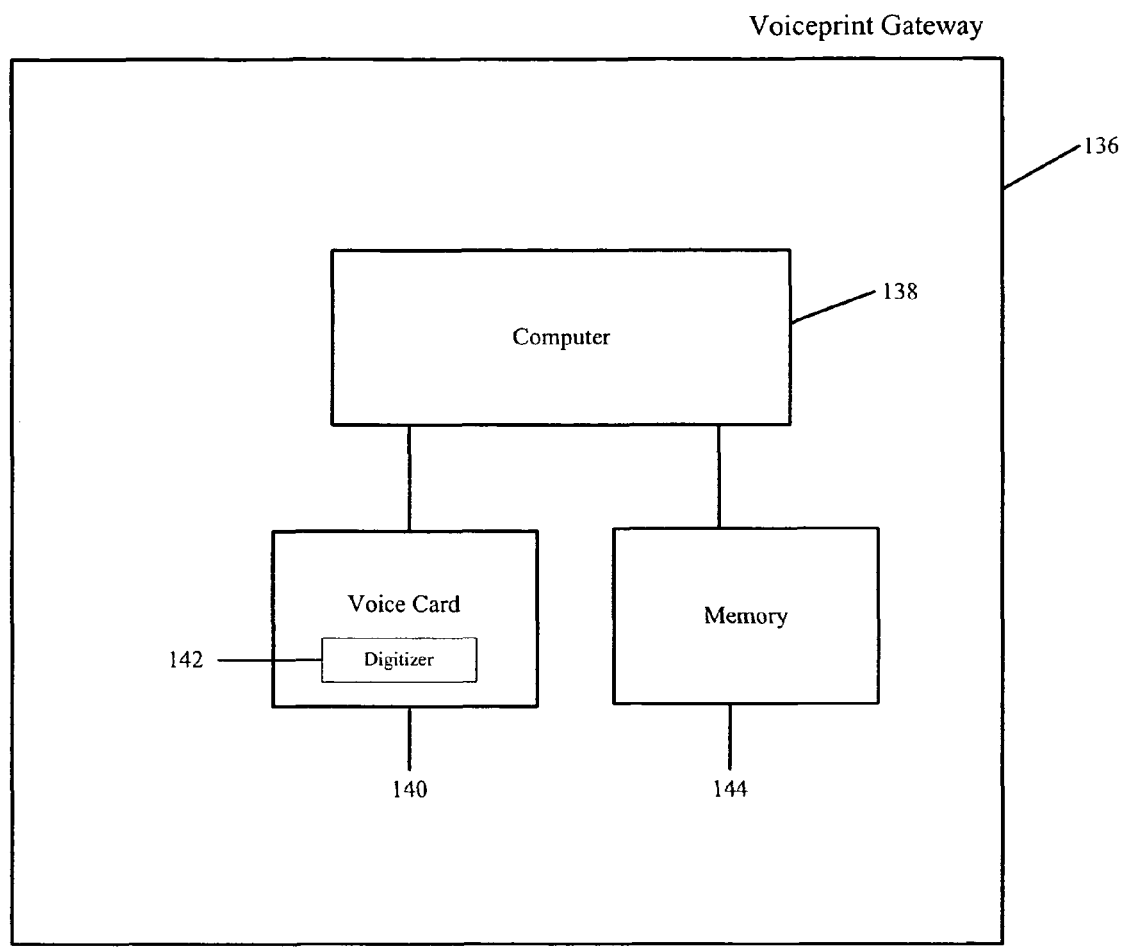
FIG. 4 is an example of a voiceprint gateway of FIG. 2, in more detail.

Voiceprint gateway 136 is provided to receive, record and digitize a voiceprint received from a caller. Voiceprints for use in developing a voiceprint sample or model for comparison to later obtained voiceprints, are also received and processed initially by voiceprint gateway 136. Processing of voiceprints into voiceprint samples is discussed further, below. Voiceprint gateway 136 may be structurally similar to voice server 134 and their functions may be combined. Voice server 134 may be coupled to servicing switch 106 through voiceprint gateway 136, instead of being directly connected to it, as shown in FIG. 2. Voiceprint gateway 136 may play instructions to a caller, as well, such as asking the caller to repeat a passphrase/password, for example, so that a voiceprint may be collected. As shown in FIG. 4, voiceprint gateway 136 may comprise computer 138, such as a general purpose computer. One or more voice cards 140 and memory 144 are coupled to computer 138. Voice card 140 may include digitizer 142. As above, memory 144 generically includes disks, caches and volatile and non-volatile memory. Voiceprint gateway 136 is coupled to servicing switch 106 via one or more T1 links 110 and to data network 118. Voiceprint gateway 136 may be a LINUX server running suitable voice recognition or speaker identification software. For example, the voiceprint gateway 136 may run SpeechSecure™ software, available from SpeechWorks International, Inc., Boston Mass. Exemplary patents related to speech verification include U.S. Pat. Nos. 6,519,561, 6,480,825, 6,038,528, 5,862,519, 5,839,103, 5,634,087, and 5,634,087, which are incorporated by reference, herein. Suitable software may also be obtained from Nuance Communications, Inc., Menlo Park, Calif., for example.

To access IASC 100 of information assistance service system 10, customers of a particular telephone carrier or company may dial, speak or otherwise communicate the access digits, access codes or retail numbers established for information assistance by that carrier to access information assistance service system 10. For example, the predetermined access digits may be "411," "*555," "555-1212," "1-800-555-1212," "1-888-411-1111," "00," or other designated access numbers. Upon receiving such access digits from a customer's communications device, the participating telephone carrier's switching system routes the call to an IASC 100 of information assistance service system 10 (via a T1 link 110), where it appears as an incoming call. Customers and other users of information assistance service system 10 may also call the system directly, in which case the call is also received by servicing switch 106 along one of the T1 links 110.

To connect a call to an IASC 100, a carrier network switch (not shown) of a participating carrier sends call setup signals containing data concerning the call, such as an ANI identifying the originating wireline or wireless phone, a dialed number identification service (DNIS) string identifying the dialed telephone number or other such communications number, the area of the call's originating site, and/or a customer identification number assigned by the carrier, to servicing switch 106. The received set-up signals are monitored and processed by switch host computer 108, which assigns a call sequence number to the call, to uniquely identify the call within the information assistance system 100. A call detail record (CDR) is created for each call by switch 106, based on this information.

System 10 uses several criteria to identify a caller as a subscriber to the system before providing service to the subscriber. Preferably, at least two criteria must be met to verify the identity of a caller as a subscriber. In one example, the first criteria is a phone number or other such identifier of a phone registered with system 10. An identifier in the call set-up signals, such as the ANI, is identified and if the phone is registered with an account with the system, the phone and the associated account is identified. The DNIS may also be used under certain circumstances, as discussed above. A caller may also inform an operator of system 10 of a phone number of a registered phone, verbally. For example, if a caller is not calling from a registered phone, an operator or voice server 134 may request that the caller provide a number of a registered phone. The caller is thereby preliminarily identified as a particular authorized user (if there is only one user associated with the account), or as one of a limited number of authorized users associated with the account.

In this example, the second criterion is the voiceprint of the caller. To verify that the caller is the preliminarily identified user or to identify the caller as a particular one of several authorized users, a voiceprint of the caller may be compared with a stored voiceprint sample or samples of authorized users of the account to determine if there is an acceptable match.

In this example, if a voiceprint sample is not available or if voiceprint analysis is not conclusive, a third criterion may be other identifying information, such as a PIN, the user's mother's maiden name, etc. Preferably, either the first and second or the first and third criteria are used to verify identity. It is preferred not to use the second and third criteria together to verify identity. This verification process will now be described in more detail.

To preliminarily identify the caller as a subscriber, switch host computer 106 may extract the ANI from the call setup signals and transmit the ANI to components of IASC 100, including profile gateway 124, through data network 118. Interface 126 of profile gateway 124 may receive the ANI and convey the ANI to processor 128. Processor 128 then requests information server 32 of information hub 30 (see FIG. 1) for a subscriber folder associated with the ANI or other such identifier in the call setup signals, via WAN 40. Information server 32 then searches information database 20 for such a subscriber folder. If a folder is found, it is sent to profile gateway 124, via WAN 40. The folder may be stored in memory 130.

If there is only one subscriber associated with the subscriber folder (and associated account), then system 10 preliminarily identifies the caller as that subscriber. If there are multiple parties associated with the folder (account), then system 10 has preliminarily identified the caller as one of those multiple parties.

The call may be directed to an operator device, such as operator telephone 112 and operator terminal 116 of an available operator, by switch 106 under the control of switch host computer 108. Information in the subscriber folder, such as the subscriber's name and preferences, is made available to an operator from profile gateway 124 via their respective terminal 116.

Automatic call distribution (ACD) logic, which may reside in switch host computer 108 or elsewhere in system 100, may be used to queue (if necessary) and distribute calls to available operators at operator devices in the order in which they are received, to evenly distribute the call traffic among the operators. Other distribution logic schemes may be used instead, such as skills-based routing or a priority scheme for preferred callers.

To confirm the identity of the caller as the preliminarily identified subscriber, or to identify the caller as one of the multiple parties to the account, the voiceprint gateway 136, voice server 124 or the operator may ask the subscriber to state their passphrase or password to obtain a voiceprint of the caller. Voiceprint gateway 136, which may be conferenced into the call, receives and digitizes the passphrase or password to form the voiceprint. The voiceprint is encapsulated within a Voice Extensible Markup Language ("Voice XML") file and sent to information server 32 with instructions to compare the voiceprint to the voiceprint sample or model stored in (or associated with) the subscriber folder in information database 34 identified through the ANI (and already provided to profile gateway 124).

The digitized voiceprint is compared to the voiceprint sample to yield a statistical measure of the correspondence between the two. The measure may be a confidence score, for example, indicative of the degree of correspondence between the received voiceprint and the stored voiceprint sample. The confidence score may be compared to a threshold to determine if the degree of correspondence is sufficient to conclude that the voiceprint and the voiceprint sample are from the same party, with an acceptable degree of certainty. If a score is below the threshold, the identity of the caller as a particular subscriber is not confirmed. The operator may then ask the caller for other information to confirm their identity, such as a PIN, name, address, mother's maiden name, etc. Voiceprint gateway 136 or voice server 134 may also compare the voiceprint to the voiceprint sample and compare the resulting confidence score to the threshold.

An upper and a lower threshold may be provided defining three ranges. If the confidence score is greater than or equal to the upper threshold, the identity of the caller as a particular subscriber is confirmed. If the confidence score is below the lower threshold, the test is failed and service will not be provided, unless the caller provides additional information to satisfy the operator that the caller is who he/she purports to be. For example, the caller could provide a name, PIN and mother's maiden name. If the confidence score is greater than or equal to the lower threshold but less than the upper threshold, the results are ambiguous and the operator, voice server 134 or voiceprint gateway 136 may ask the caller to repeat the passphrase/password or provide other information, such as a PIN. On a scale of 0.0 through 1,000.0, the upper threshold may be 600 and the lower threshold 350, for example.

A subscriber may fail the voiceprint test because the registered phone number of the subscriber has been assigned to another party. The subscriber may have moved, for example, and not updated system 10. Alternatively, the caller may be a subscriber using a new phone, who may not have updated system 10. The operator may then update the subscriber's account. If the caller does not have a subscription, the operator may offer to register the caller with system 10.

If there is only one subscriber to an account, then the voiceprint received from the caller need only be compared to the one or more voiceprint samples of that subscriber. In this case, the voiceprint verifies the identity of the subscriber, who has been preliminarily identified based on the ANI or other such identifier of the subscriber's phone.

If there are multiple parties to the account, such as family members or employees of a business, there may be multiple sets of voiceprint samples in or associated with the account. The received voiceprint may be compared to each set of voiceprint samples and the identity of the caller may be determined based on the voiceprint sample in the set with the highest confidence score equal to or above the threshold. Multiple thresholds may be provided, as discussed above. In this way, a caller may be identified without requiring input of a PIN or other such information.

If a subscriber is calling from a public phone or another party's phone who is not a subscriber to system 10, the ANI of the phone will not be correlated with a subscriber account. In that case, the operator, or voice server 134 or voiceprint gateway 136 may then ask for identifying information, such as the caller's name or phone number of the phone registered with the system. The caller's voiceprint may then be used to verify the identity of the caller. Further information may be requested to verify the identity of the caller, such as the user's PIN, password, mother's maiden name, etc. The voiceprint may then be used, if desired, to provide further verification that the caller is the subscriber corresponding to the PIN, etc.

If the caller is using another subscriber's phone, then the system will preliminarily identify the caller as that other subscriber. The voiceprint of the caller should not, however, sufficiently correspond to the voiceprint of the other subscriber and the identity of the caller as the subscriber will not be verified. Again, the operator, voice server 134 or voiceprint gateway 136 will then ask the caller for the caller's name and/or phone number of a registered phone. The voiceprint and/or other identifying information may then be used to verify the identity of the caller, as discussed above.

After verification of the identity of the subscriber, the operator may address the subscriber by the name found in the subscriber folder. The subscriber may then request information assistance, such as the phone number and/or address, of a party and/or concierge services. Concierge services include the name, address, and phone number of parties providing particular requested goods and services, including food and entertainment services. The operator may enter the name of the requested party into a field of a graphical user interface ("GUI"), which may be a form template appearing on the display of the operator's terminal 116, through a keyboard or other such input device. The operator submits the requested party's name to database server 120 via data network 118 by clicking on a button or tab on the screen or depressing a key on the keyboard. Database server 120 conducts a search of directory assistance database 122 for the requested party.

If a phone number, address or other such communications identification corresponding to the requested party's name is found, the number may be sent to the requesting operator terminal 116 by database server 120. The retrieved number may be displayed on the operator's monitor. The customer may then be verbally informed of the number by the operator. Alternatively, the number may be provided to voice server 134 via switch host computer 108. Voice server 134 may then generate a message reciting the number.

The information assistance call may then be terminated or the customer may be given the option of being connected with the communications number (i.e. telephone number) of the requested party, as is known in the art. The option may be presented by the operator or by voice server 134. The customer may accept the option by a verbal indication to the operator or voice server 134 or by entry of data through the customer's phone. If the call is connected to the requested party, servicing switch 106 may send call setup signals for the call, including the requested party's number as a DNIS, to a carrier switch for connection to the requested party. Alternatively, system 10 may connect the call to the requested party via servicing switch 106. The information assistance call is then completed. The connection between the customer and the IASP 10 may be terminated or it may be maintained in order to provide additional information assistance via the well-known StarBack® feature.

Instead of connecting the call to an operator at an operator device, switch host computer 108 may connect the call to voice server 134 to request verbal input of a requested party's name or concierge request and/or to present other options, as is known in the art. If voice server 134 can identify the request, the name is conveyed to data server 120 via data network 118, to conduct a search, as described above. If voice server 134 cannot identify the request, the call is connected to an operator device by switch host computer 108 for handling by an operator, as described above.

As mentioned above, verbal utterances of a subscriber to system 10 may be collected during phone registration of the subscriber (or at a later time) to derive voiceprint samples. Voiceprint gateway 136 may be conferenced into the call, and request the new subscriber to repeat a passphrase or password several times, such as three times, for example. The passphrase or password is recorded and digitized by voiceprint gateway 136. The digitized voiceprints are encapsulated in a Voice XML file and sent to information server 32 with instructions that the voiceprints are to be processed to form voiceprint samples. Information server 32, which also runs SpeechWorks™ or other appropriate software, creates a mathematical representation of the voiceprints to form a voiceprint model or sample, and stores the voiceprint sample. Preferably, the voiceprint sample is stored in information database 34 as part of the subscriber profile in a folder for the new subscriber. Voiceprint gateway 136 or voice server 134 may process the voiceprints into voiceprint samples instead of or along with information server 34, as well.

If multiple parties are registering under the same account, verbal utterances of each registered party may be collected and processed in turn. Each registered party may also establish other preferences, such as how they wish to be addressed by the operator and what language they prefer when dealing with system 10, for example. The voiceprint sample identifying information and preferences of each registered party to the account are preferably associated with separate subscriber profiles or sub-profiles within the subscriber folder associated with the account. The subscriber folder, and hence each of the profiles or sub-profiles, is associated with the ANI of the phones registered with the account. The information may be organized in other ways, as well.

Asking a subscriber to repeat a particular passphrase or password multiple times, may make the subscriber nervous and speak unnaturally. It may also increase the time required to register the subscriber, which may be annoying. Accordingly, voiceprint samples may be derived from verbal utterances during registration of the subscriber. For example, during registration of a new subscriber, the new subscriber is typically asked for their name, address, phone numbers of wireline or wireless phones or communications numbers of other communications devices they may use, a password, a PIN, credit card information to pay for the subscription, etc. The new subscriber verbally provides this information in response to queries by an operator, account representative or voice server 134.

Figure 5:
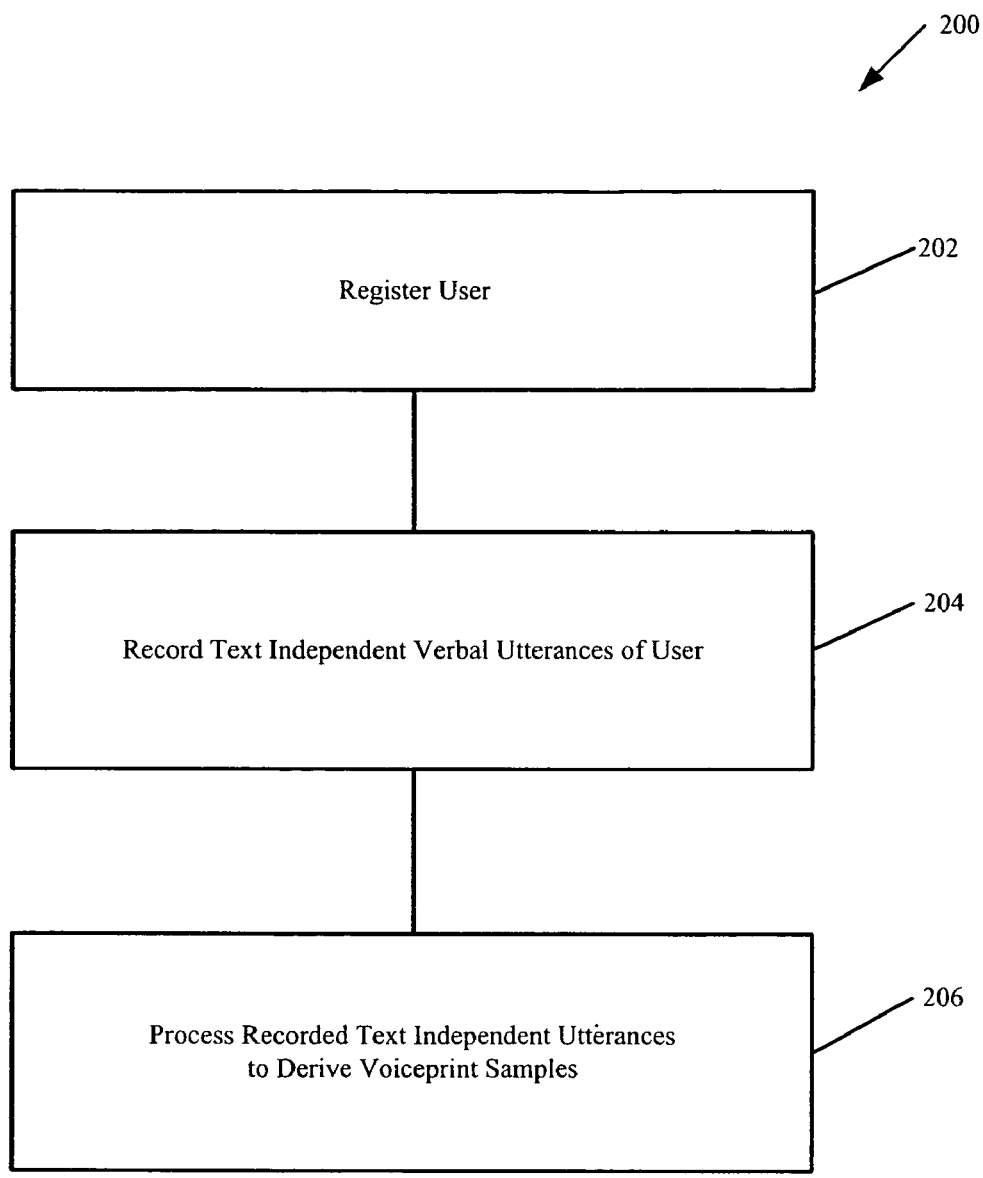
FIG. 5 is a flowchart illustrating a routine of obtaining a voiceprint sample.

A voiceprint sample may be derived based on the verbal utterances of the subscriber during this registration process. SpeechSecure™, for example, may derive a voiceprint sample in a text independent mode, where a speaker does not follow a predetermined script (such as repeating a passphrase or password). The subscriber's verbal utterances may be readily distinguished from that of the operator because the operator's voice and the subscriber's voice by changing the state of the connection between the operator and the subscriber. For example, the connection may be changed from a two way to a one way conference connection, for example, FIG. 5 is an example of a method 200 whereby a new subscriber to information assistance service system 10 is registered with the system, in Step 202. Text independent verbal utterances are recorded in Step 204, as the subscriber is speaking to the operator and providing registration information. The recorded utterances are processed into a voiceprint sample, in Step 206. For example, text independent processing may be used to derive the voiceprint sample.

In accordance with an embodiment of the invention, one or more voiceprint samples are obtained from a subscriber in addition to the voiceprint sample obtained upon registration, and stored in association with information identifying the subscriber, e.g., in a voiceprint sample table in the subscriber's user profile. Subsequently, when a call from the subscriber is received by system 10, a voiceprint is obtained during the call and compared to one or more of the voiceprint samples stored in the table. If any one of the comparisons is successful, the subscriber's identity is verified, and the subscriber is authorized to receive services from system 10.

Figure 6:
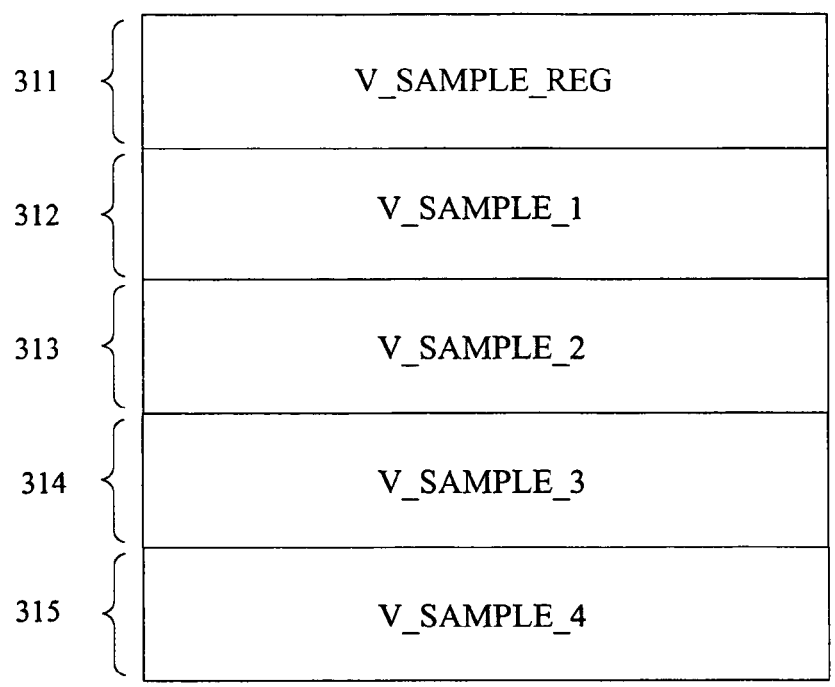
FIG. 6 illustrates a voiceprint sample table in accordance with the invention.

Accordingly, when a subscriber registers with system 10, a voiceprint sample table is initialized and stored in the subscriber's user profile. FIG. 6 illustrates a voiceprint sample table 302 comprising five records 311-315, each of which may store a voiceprint sample associated with the subscriber. As mentioned above, upon registration, a voiceprint sample (represented in FIG. 6 as V_SAMPLE_REG) is obtained and stored in record 311.

Figure 7A:
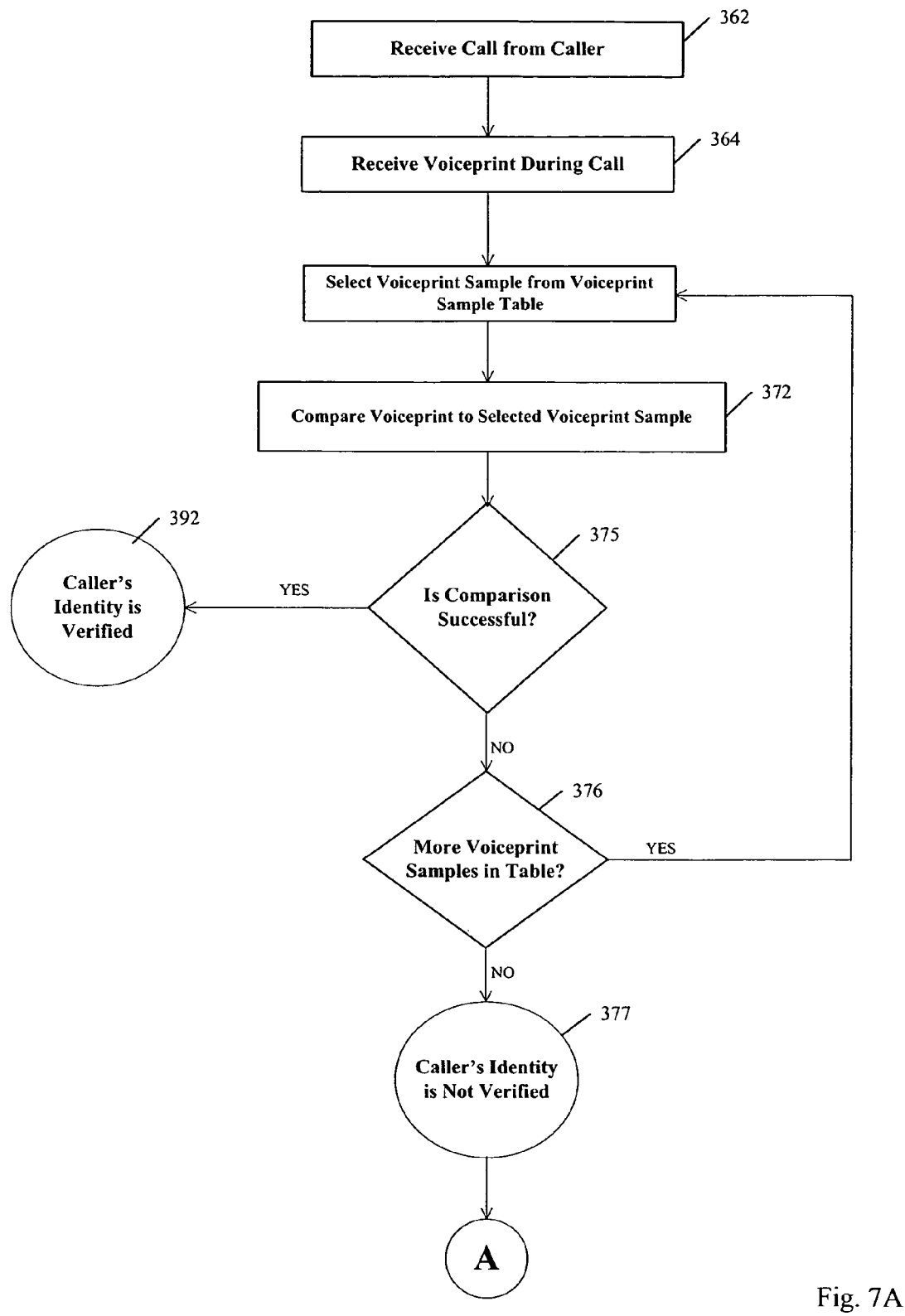
FIGS. 7A and 7B are flowcharts jointly illustrating a routine for obtaining and storing voiceprint samples in accordance with a first embodiment of the invention.
Figure 7B:
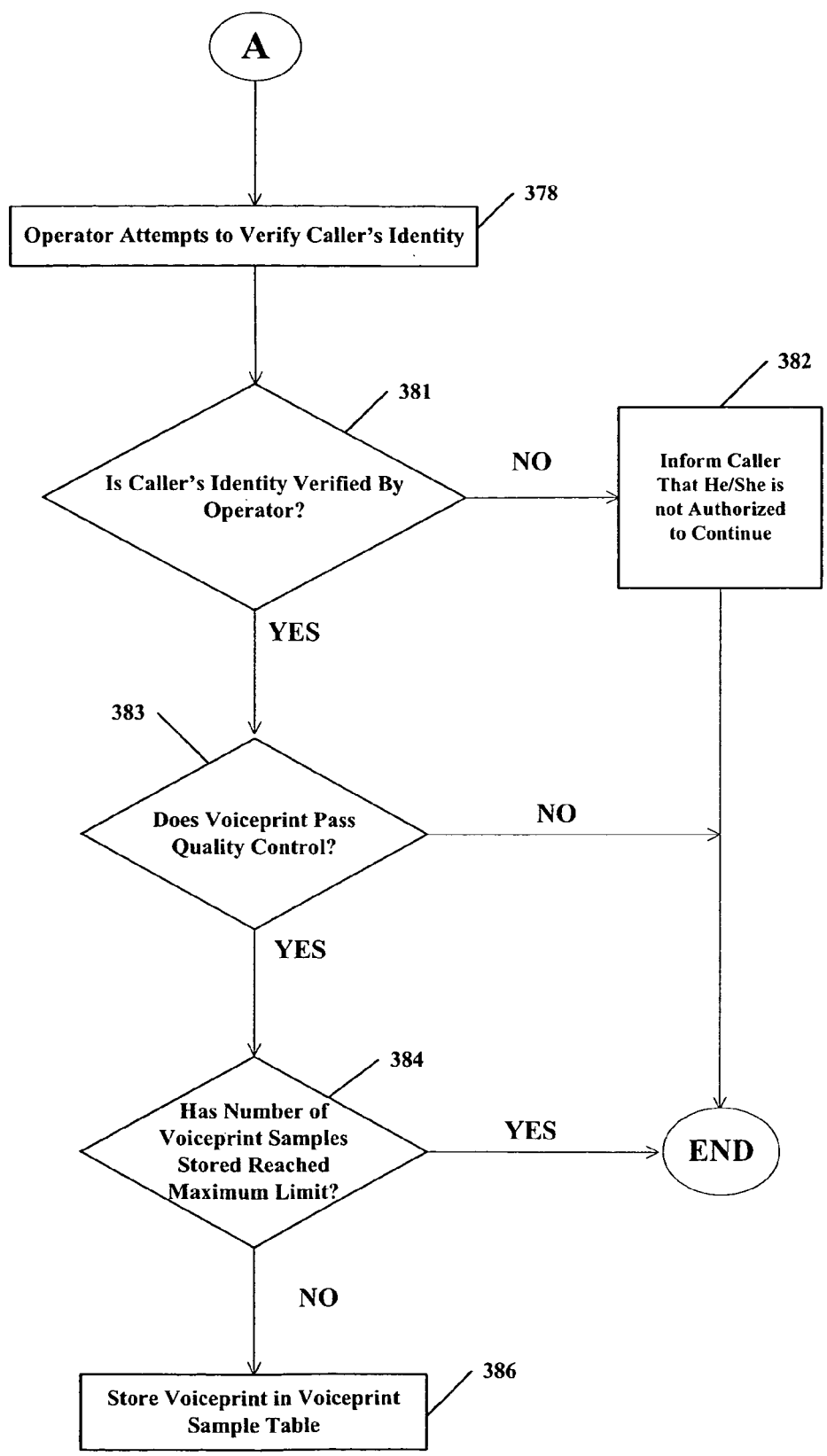

As calls are received from the subscriber from time to time, additional voiceprint samples may be added to voiceprint sample table 302. However, in this illustrative embodiment, a limit is imposed on the number of voiceprint samples that can be stored in table 302, e.g., 5 samples. FIGS. 7A and 7B jointly illustrate a flowchart depicting a routine for obtaining and storing additional voiceprint samples, in accordance with an embodiment of the invention. Suppose that subsequent to registration, another call is received from the subscriber, in accordance with step 362. In the manner described above, voiceprint gateway 136 obtains a voiceprint from the subscriber during the call (step 364). Additionally, identifying information such as an ANI is received from the subscriber's telephone, or alternatively identifying information is obtained verbally from the subscriber, and a preliminary determination as to the subscriber's identity is made based on this information. For example, an ANI received during the call may be used to identify the subscriber's user profile, which stores voiceprint sample table 302. Voiceprint gateway 136 accordingly transmits the voiceprint to information server 32 with instructions to compare the voiceprint to the voiceprint samples stored in table 302.

Information server 32, using the ANI received during the call, identifies and accesses voiceprint sample table 302 and, at step 366, selects a voiceprint sample from among those stored in the table. At this point, only V_SAMPLE_REG is stored in table 302. Accordingly, voiceprint sample V_SAMPLE_REG is retrieved from record 311 and, at step 372, compared to the subscriber's voiceprint in the manner described above to yield a confidence score. In this example, the comparison is considered successful if the confidence score equals or exceeds a selected threshold, e.g., 600 on a scale of 0 through 1000.00. Referring to block 375, if the comparison is successful, the caller's identity is verified (step 392).

Supposing instead that the confidence score is below the selected threshold (and the identity of the caller is not confirmed), the routine proceeds from block 375 to block 376, and information server 32 determines whether table 302 contains any more voiceprint samples. If table 302 contains additional voiceprint samples, the routine returns to step 366 and another voiceprint sample is selected from the table. In the present example, however, because table 302 contains only V_SAMPLE_REG, the routine proceeds to step 377 and the caller's identity remains unverified.

Because the caller's identity remains unverified at this stage, the routine now proceeds to step 378 in FIG. 7B. At step 378 the operator attempts to verify the caller's identity based on other information, such as a PIN, name, address, mother's maiden name, etc. Referring to block 381, if the operator fails to verify the caller's identity, the caller is informed that he/she is not authorized to continue (at step 382), and the call may be discontinued. In such case, the routine comes to an end.

Supposing that the operator succeeds in verifying the caller's identity, the caller's voiceprint obtained during the current call becomes a candidate of a voiceprint sample for use in future verification of the caller's identity, in accordance with the invention. However, before the voiceprint in question is adopted for such use, server 32 examines the quality of the voiceprint and determines whether it passes certain quality control, as indicated in block 383. For example, as part of the quality control, server 32 may determine whether the energy content of the voiceprint exceeds a certain minimum threshold, whether the confidence scores resulting from comparing the voiceprint with the respective voiceprint samples in table 302 each exceed a minimum score (e.g., 300), etc. If the voiceprint does not pass the quality control in question, the routine comes to an end. Otherwise, if it passes the quality control, the routine proceeds to block 384, where information server 32 examines voiceprint sample table 302 and determines whether the number of voiceprint samples stored therein has reached the maximum limit, e.g., 5. In this instance, server 32 determines that table 302 currently contains only one voiceprint sample. Thus, in accordance with block 384, the routine proceeds to step 386 and information server 32 stores the caller's voiceprint (represented as V_SAMPLE_1 in FIG. 6) as record 312 in voiceprint sample table 302.

As calls are received from time to time by from the subscriber, additional voiceprints are obtained and selectively added to voiceprint sample table 302. At a subsequent point in time, the number of voiceprint samples stored in table 302 may reach the maximum limit. Referring again to FIG. 6, for example, table 302 eventually comprises five voiceprint samples, V_SAMPLE_REG, V_SAMPLE_1, V_SAMPLE_2, V_SAMPLE_3, and V_SAMPLE_4 resulting from the routine of FIGS. 7A and 7B. It should be noted that although in this example, table 302 comprises five voiceprint sample records, in various alternative embodiments, voiceprint sample table 302 may include any number of records.

Referring again to step 362 of FIG. 7A, suppose now that after the five voiceprint samples shown in FIG. 6 are stored in table 302, yet another call is received from the subscriber. A voiceprint is obtained during the call (step 364) and compared to each of the voiceprint samples in table 302. In accordance with steps 366-376, if any one of the voiceprint samples produces a successful comparison (i.e., a sufficiently high confidence score, e.g. 600), the caller's identity is verified (block 392). If none of the stored voiceprint samples produces a successful comparison, the routine proceeds as outlined in FIG. 7B, as described above.

In one embodiment of the invention, when table 302 contains the maximum number of voiceprint samples (i.e., each of the five records 311-315 holds a voiceprint sample), table 302 is deemed complete and no additional change is made. The five voiceprint samples stored therein are subsequently used during each call from the subscriber for the purpose of verifying his/her identity.

Alternatively, table 302 may be regularly monitored, and any stored voiceprint sample that remains unused for a predetermined duration of time is removed. By deleting such voiceprints, the respective record in table 302 is cleared, providing space for another, possibly more productive, voiceprint sample to be obtained during a subsequent call.

FIG. 8 illustrates a voiceprint sample table 822 that may be used to store voiceprint samples, in accordance with this alternative embodiment of the invention. Table 822 comprises two columns 806 and 808. Column 806 holds a voiceprint sample. Column 808 stores a date indicating the later of (i) the date on which the respective voiceprint sample was generated and stored in the table and (ii) the most recent date on which the respective voiceprint sample was used successfully to verify a caller's identity (this date being referred to as the "most recent use date"). Note that record 811, which stores the voiceprint sample obtained during registration, does not include a date. Each time a respective voiceprint sample is used to verify caller's identity, the record containing the voiceprint sample is updated to reflect the current date (with the exception of record 811).

Information server 32 from time to time examines table 822 and deletes any voiceprint sample. By way of example, information server 32 may examine voiceprint sample table 822 periodically—say, once per week—to determine whether any of the records therein contains a most recent use date more than six months old.

Suppose, for example, that on September 23, YYYY, table 822 appears as shown in FIG. 8. On this date, information server 32 examines table 822 and determines that record 812 includes a most recent use date, '03-22-YYYY,' that is more than six months old. Accordingly, the contents of record 812 are deleted. FIG. 9 shows table 822 after the contents of record 812 have been deleted, having room to accommodate a fresh voiceprint sample.

Now suppose that another call is received from the subscriber (step 362 of FIG. 7A), and another voiceprint, V_SAMPLE_5, is obtained (step 364). Voiceprint gateway 136 transmits voiceprint V_SAMPLE_5 to information server 32 with instructions to compare voiceprint V_SAMPLE_5 to the voiceprint samples stored in table 822.

Information server 32 accesses voiceprint sample table 822 and, in accordance with step 372-376 of FIG. 7A, compares V_SAMPLE_5 to voiceprint samples V_SAMPLE_REG, V_SAMPLE_2, V_SAMPLE_3, and V_SAMPLE_4. Supposing that each of these comparisons fails, and supposing further that the operator then succeeds in verifying the caller's identity in accordance with the routine outlined in FIG. 7B, information server 32 examines table 822 and determines that the memory space previously occupied by V_SAMPLE_1 is available. Accordingly, server 32 stores voiceprint V_SAMPLE_5 as record 812, as shown in FIG. 10.

In another embodiment of the invention, a voiceprint sample is derived from one or more subscriber's verbal utterances during registration and stored, e.g., in a voiceprint sample table. In addition, the original voice signal used to derive the voiceprint sample is combined with one or more background noises to generate one or more modified voiceprint samples for verifying the identity of the subscriber, in anticipation that the subscriber's verbal utterance during a future identity verification may be subject to such background noises. These modified voiceprint samples may also be stored, e.g., in the voiceprint sample table with the voiceprint sample derived during registration. Subsequently, when a call is received from the subscriber, a voiceprint is obtained from the subscriber during the call, and the voiceprint is compared to one or more of the voiceprint samples stored in the table. If the caller's voiceprint produces a successful comparison with the voiceprint samples in the table, the subscriber's identity is verified.

As described above, the voiceprint sample obtained during registration is derived from a digitized recording of the voice signal obtained from the subscriber's telephone. Typically, the digitized recording, referred to as the "original voice signal," contains one or more selected verbal utterances. The original voice signal is processed using, e.g., commercially available signal processing software, such as SpeechWorks™, to generate a voiceprint sample. The voiceprint sample may be stored, e.g., in a voiceprint sample table. The original voice signal may also be stored in association with the voiceprint sample.

Figure 11:
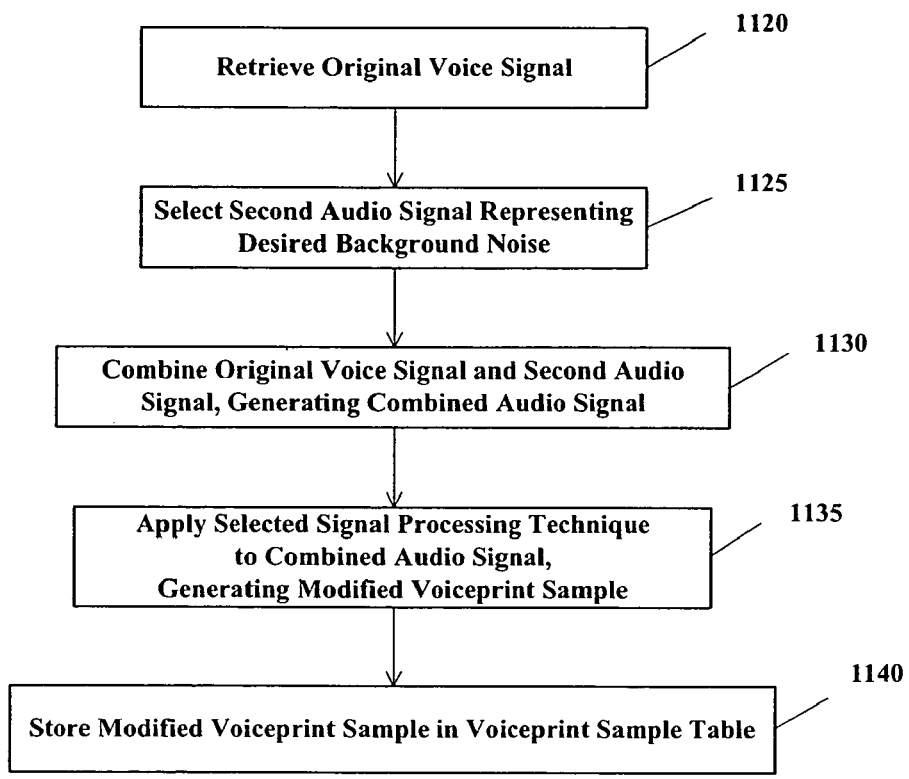
FIG. 11 is a flowchart depicting a routine for generating a modified voiceprint sample, in accordance with a second embodiment of the invention.

One or more modified voiceprint samples may be generated in a similar manner. FIG. 11 is a flowchart depicting a routine for generating a modified voiceprint sample, in accordance with this embodiment of the invention. The original voice signal is first retrieved from memory (step 1120). At step 1125, a second audio signal is selected from storage; the second signal represents a typical background noise corrupting a verbal utterance on the phone, such as the sound produced by a car's air conditioner when a caller talks on the phone inside a car. The second audio signal may be further processed to adjust selected parameters such as amplitude, frequency range, etc. At step 1130, information server 32 combines the original voice signal with the second audio signal to generate a combined audio signal. The original voice signal and the second audio signal may be combined using a well-known audio signal mixing technique, such as superposition and averaging, for example. The resulting combined audio signal represents a mixture of the sound of the subscriber's voice and the desired background noise, e.g., the sound of a car's air conditioner. At step 1135, the combined audio signal is processed using, e.g., commercially available signal processing software such as SpeechWorks™. The resulting modified voiceprint sample is stored in a voiceprint sample table, at step 1140. The routine outlined in FIG. 11 may be repeated any number of times to generate multiple modified voiceprint samples each representing the subscriber's voice mixed with a respective background noise.

Multiple modified voiceprint samples may be generated to represent different sounds associated with a single background activity. For example, information server 32 may mix a subscriber's original voice signal, first, with a first audio signal representing a car air conditioner running on low power, to produce a first modified voiceprint sample; second, with a second audio signal representing a car air conditioner running on medium power, to produce a second modified voiceprint sample; and, third, with a third audio signal representing a car air conditioner running on high power, to produce a third modified voiceprint sample. Related voiceprint samples may be stored in a voiceprint sample table in association with one another to form a "cluster."

Figure 12:
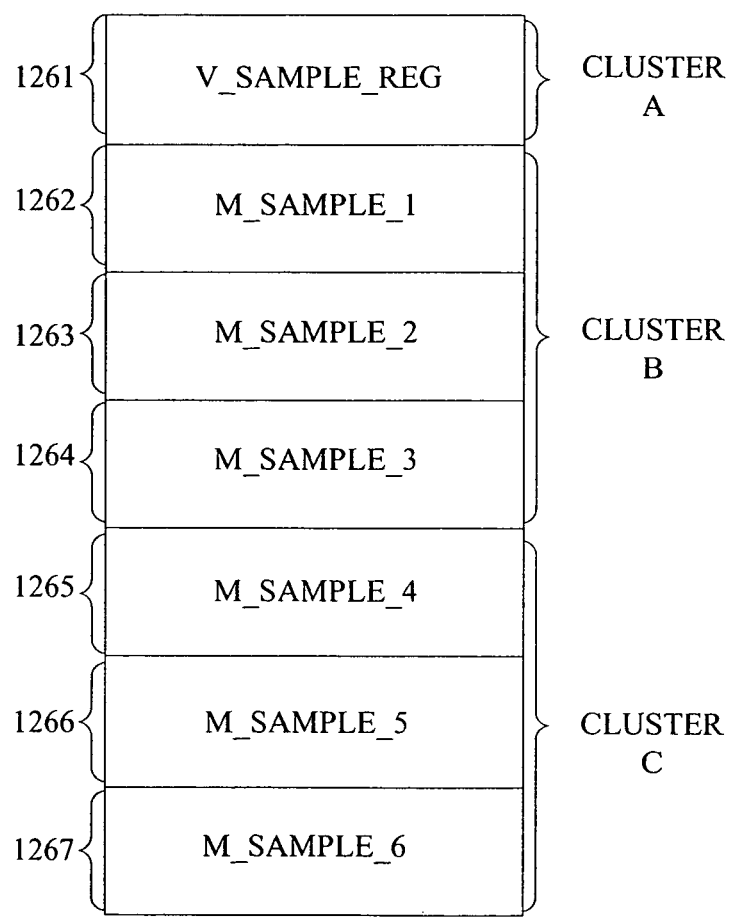
FIG. 12 illustrates an example of a voiceprint sample table in accordance with the second embodiment.

By way of example, suppose that when a subscriber registers, an original voice signal is received and used to generate a voiceprint sample, which is stored in a voiceprint sample table as shown in FIG. 12. Table 1250 comprises seven voice print sample records 1261-1267. The voiceprint sample obtained during registration, V_SAMPLE_REG, is stored in record 1261. Information server 32 then uses the routine outlined in FIG. 11 to generate six modified voiceprint samples. In this example, information server 32 generates M_SAMPLE_1, M_SAMPLE_2, and M_SAMPLE_3 each representing the sound of the subscriber's voice mixed with a respective sound associated with a car air conditioner; and M_SAMPLE_4, M_SAMPLE_5 and M_SAMPLE_6, each representing the sound of the subscriber's voice mixed with a respective sound associated with traffic. M-SAMPLE_1, M_SAMPLE_2, M_SAMPLE_3, M_SAMPLE_4, M_SAMPLE_5, and M_SAMPLE_6 are stored in records 1262-1267, respectively.

As indicated in FIG. 12, the voiceprint samples in table 1250 are grouped into clusters. Cluster A includes only V_SAMPLE_REG, the voiceprint sample obtained during registration. Cluster B includes voiceprint samples containing sounds of an air conditioner, and includes M_SAMPLE_1, M_SAMPLE_2 and M_SAMPLE_3; Cluster C includes voiceprint samples containing sounds of traffic, and includes M_SAMPLE_4. M_SAMPLE_5 and M_SAMPLE_6.

When a subsequent call is received from the subscriber, the voiceprint samples stored in table 1250 are used to verify the subscriber's identity. A voiceprint is obtained from the caller during the call, in the manner described above. Information server 32 accesses table 1250 and first selects cluster A, which includes V_SAMPLE_REG. V_SAMPLE_REG is compared to the caller's voiceprint, generating a confidence score. If the confidence score equals or exceeds a first predetermined threshold, say, 500 on a scale of 0 through 1000.00, the comparison is deemed successful, and the caller's identity is verified. If the comparison fails, information server 32 selects cluster B, which includes M_SAMPLE_1, M_SAMPLE 2, and M_SAMPLE_3. Information server 32 compares the caller's voiceprint to each of the voiceprint samples in cluster B, obtaining a respective confidence score from each comparison. In this example, if any two of the three confidence scores equals or exceeds a second predetermined threshold, say, 400 on a scale of 0 through 1000.00, the caller's identity is verified. The second threshold may be different from the first threshold. If this condition is not satisfied, the voiceprints in cluster C may be selected and used for comparison purposes.

In an alternative embodiment, the voiceprint obtained during the call is compared to one or more of the stored voiceprint samples individually, in a manner similar to that illustrated in FIG. 7A. If any one of the comparisons is successful, the caller's identity is verified.

In yet another alternative embodiment, an additional test is performed to monitor the accuracy of the voiceprint comparison algorithm itself. This test operates according to the principle that the various stored voiceprint samples include at least two samples containing different, and "mutually exclusive," sounds (e.g., an announcement in a train station vs. car air conditioner noise), both of which are not likely to produce a successful comparison at the same time. Accordingly, the voiceprint obtained during the call is compared individually to each of the stored voiceprint samples. If all, or a predetermined number, of the comparisons produce confidence scores that equal or exceed a selected threshold, the comparison algorithm is deemed to be faulty, and the voiceprint is rejected.

It should be noted that, while in the description above, the communications system 10 is illustratively used for an information assistance service, the present invention may be used in other types of voice communications services that are subscription based and/or include accounts with multiple parties.

It should also be noted that the communications systems and their components are disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

The foregoing merely illustrates the principles of the invention. It will thus be appreciated that those skilled in the art will be able to devise numerous other arrangements that embody the principles of the invention and are thus within the spirit and scope of the invention, which is defined by the claims, below.

What is claimed is:

1. A method for verifying a calling party's identity during a call, comprising:
   obtaining data concerning the calling party;
   deriving a voiceprint from a verbal utterance by the calling party during the call;
   verifying the identity of the calling party based on a comparison of the voiceprint with one or more voiceprint samples stored in association with the data concerning the calling party wherein at least one of the one or more voiceprint samples is associated with a time when the at least one voiceprint sample last compared successfully to a voiceprint of the calling party and wherein the at least one voiceprint sample is removed from storage as a function of the time;
   if the comparison fails to verify the identity of the calling party, determining the identity of the calling party based on identifying information received during the call; and
   if the identity of the calling party is determined based on the identifying information, selectively storing the voiceprint in association with the data as a voiceprint sample.

2. The method of claim 1, wherein the call is received from a wireline telephone.

3. The method of claim 1, wherein the call is received from a wireless telephone.

4. The method of claim 1, wherein the data includes an automatic number identification (ANI).

5. The method of claim 1, wherein the data identifies an account associated with the calling party.

6. The method of claim 1, wherein the comparison generates a confidence score.

7. The method of claim 6, wherein the comparison fails if the confidence score is less than a selected threshold value.

8. The method of claim 1, wherein the identifying information includes at least one item of information chosen from the group consisting of a personal identification number (PIN), a name, an address, and the calling party's mother's maiden name.

9. A method for verifying a calling party's identity, comprising:
   obtaining voice signals each containing a verbal utterance by the calling party at some point before the call;
   mixing the voice signals with at least one audio signal containing a selected background noise, resulting in mixed signals;
   deriving voiceprint samples from the mixed signals;
   storing the voiceprint samples in association with an identifying data concerning the calling party, wherein at least one of the voiceprint samples is associated with a time when the at least one voiceprint sample last compared successfully to a voiceprint of the calling party and wherein the at least one voiceprint sample is removed from storage as a function of the time:
   receiving a data corresponding to said identifying data during said call;
   retrieving at least one of the voiceprint samples based on the received data;
   obtaining a second voice signal containing a verbal utterance by the calling party during the call;
   deriving a voiceprint from the second voice signal; and
   performing a comparison of the voiceprint with the at least one retrieved voiceprint sample to verify the calling party's identity.

10. The method of claim 9, wherein the background noise includes a sound generated by an air conditioner in a vehicle.

11. The method of claim 9, wherein the background noise relates to surrounding traffic.

12. The method of claim 9, wherein the comparison yields a first comparison result, the voiceprint sample being grouped with at least a second voiceprint sample based on a category of the background noise, the method further comprising performing a second comparison of the voiceprint with the second voiceprint sample, yielding a second comparison result.

13. The method of claim 12, wherein verification of the calling party's identity is a function of at least the first comparison result and the second comparison result.

14. A system for verifying a calling party's identity during a call, comprising:
   an interface for obtaining data concerning the calling party;
   a device for deriving a voiceprint from a verbal utterance by the calling party during the call; and
   a mechanism for verifying the identity of the calling party based on a comparison of the voiceprint with one or more voiceprint samples stored in association with the data concerning the calling party, wherein at least one of the one or more voiceprint samples is associated with a time when the at least one voiceprint sample last compared successfully to a voiceprint of the calling party and wherein the at least one voiceprint sample is removed from storage as a function of the time, the identity of the calling party being determined based on identifying information received during the call if the comparison fails to verify the identity of the calling party, and if the identity of the calling party is determined based on the identifying information, the voiceprint being selectively stored in association with the data as a voiceprint sample.

15. The system of claim 14, wherein the call is received from a wireline telephone.

16. The system of claim 14, wherein the call is received from a wireless telephone.

17. The system of claim 14, wherein the data includes ANI.

18. The system of claim 14, wherein the data identifies an account associated with the calling party.

19. The system of claim 14, wherein the comparison generates a confidence score.

20. The system of claim 19, wherein the comparison fails if the confidence score is less than a selected threshold value.

21. The system of claim 14, wherein the identifying information includes at least one item of information chosen from the group consisting of a personal identification number (PIN), a name, an address, and the calling party's mother's maiden name.

22. A system for verifying a calling party's identity, comprising:
- an interface for obtaining voice signals each containing a verbal utterance by the calling party at some time before the call;
- a device for mixing the voice signals with at least one audio signal containing a selected background noise, resulting in a mixed signal;
- a mechanism for deriving voiceprint samples from the mixed signals, the voiceprint samples being stored in association with an identifying data concerning the calling party, wherein at least one of the voiceprint samples is associated with a time when the at least one voiceprint sample last compared successfully to a voiceprint of the calling party and wherein the at least one voiceprint sample is removed from storage as a function of the time;
- a receiver for receiving a data corresponding to said identifying data during said call, at least one of the voiceprint samples being retrieved based on the received data, the interface obtaining a second voice signal containing a verbal utterance by the calling party during the call, a voiceprint being derived from the second voice signal; and
- a processing unit programmed to perform a comparison of the voiceprint with the at least one retrieved voiceprint sample to verify the calling party's identity.

23. The system of claim 22, wherein the background noise includes a sound generated by an air conditioner in a vehicle.

24. The system of claim 22, wherein the background noise relates to surrounding traffic.

25. The system of claim 22, wherein the comparison yields a first comparison result, the voiceprint sample being grouped with at least a second voiceprint sample based on a category of the background noise, a second comparison of the voiceprint with the second voiceprint sample being performed, yielding a second comparison result.

26. The system of claim 25, wherein verification of the calling party's identity is a function of at least the first comparison result and the second comparison result.

* * * * *